United States Patent
Chang et al.

(10) Patent No.: US 11,663,402 B2
(45) Date of Patent: May 30, 2023

(54) TEXT-TO-VECTORIZED REPRESENTATION TRANSFORMATION

(71) Applicant: International Business Machines Corporation, Armonk, NY (US)

(72) Inventors: Chao-Min Chang, Taipei (TW); Kuei-Ching Lee, New Taipei (TW); Ci-Hao Wu, Taipei (TW); Chia-Heng Lin, Taipei (TW)

(73) Assignee: International Business Machines Corporation, Armonk, NY (US)

(*) Notice: Subject to any disclaimer, the term of this patent is extended or adjusted under 35 U.S.C. 154(b) by 314 days.

(21) Appl. No.: 16/934,220

(22) Filed: Jul. 21, 2020

(65) Prior Publication Data
US 2022/0027557 A1 Jan. 27, 2022

(51) Int. Cl.
*G06F 40/242* (2020.01)
*G06F 40/295* (2020.01)
*G06F 40/58* (2020.01)

(52) U.S. Cl.
CPC .......... *G06F 40/242* (2020.01); *G06F 40/295* (2020.01); *G06F 40/58* (2020.01)

(58) Field of Classification Search
CPC ................ G06F 40/242; G06F 40/295; G06K 9/6256; G06N 20/00
See application file for complete search history.

(56) References Cited

U.S. PATENT DOCUMENTS

| 10,891,673 | B1 * | 1/2021 | Sawaf | G06Q 30/0643 |
| 11,086,857 | B1 * | 8/2021 | Ganu | G06F 16/24522 |
| 11,216,510 | B2 * | 1/2022 | Jiang | G06N 3/0454 |
| 2017/0011289 | A1 * | 1/2017 | Gao | G06F 40/268 |
| 2018/0075017 | A1 * | 3/2018 | Takase | G06F 16/3344 |

(Continued)

FOREIGN PATENT DOCUMENTS

| CN | 108417210 A | 8/2018 |
| CN | 109460455 A * | 3/2019 | G06F 40/211 |

(Continued)

OTHER PUBLICATIONS

"IBM QRadar Advisor with Watson", IBM, downloaded from the internet on Jun. 3, 2020, 6 pages, <https://www.ibm.com/au-en/marketplace/cognitive-security-analytics>.

(Continued)

*Primary Examiner* — Anne L Thomas-Homescu
(74) *Attorney, Agent, or Firm* — Monchai Chuaychoo

(57) ABSTRACT

An approach for a fast and accurate word embedding model, "desc2vec," for out-of-dictionary (OOD) words with a model learning from the dictionary descriptions of the word is disclosed. The approach includes determining that a target text element is not in a set of reference text elements, information describing the target text element is obtained. The information comprises a set of descriptive text elements. A set of vectorized representations for the set of descriptive text elements is determined. A target vectorized representation for the target text element is determined based on the set of vectorized representations using a (Continued)

machine learning model. The machine learning model is trained to represent a predetermined association between the set of vectorized representations for the set of descriptive text elements describing the target text element and the target vectorized representation.

18 Claims, 7 Drawing Sheets

(56) References Cited

U.S. PATENT DOCUMENTS

| | | | |
|---|---|---|---|
| 2019/0286716 A1* | 9/2019 | Lin | G06F 16/3338 |
| 2019/0325029 A1* | 10/2019 | Gandhi | G06F 40/284 |
| 2020/0175360 A1* | 6/2020 | Conti | G06V 10/82 |
| 2020/0293717 A1* | 9/2020 | Kobayashi | G06F 40/279 |
| 2020/0334410 A1* | 10/2020 | Yerebakan | G06F 40/284 |
| 2020/0394364 A1* | 12/2020 | Venkateshwaran | G06F 40/137 |
| 2021/0026906 A1* | 1/2021 | Reznik | G06F 16/248 |
| 2021/0056164 A1* | 2/2021 | Mustafi | G06N 20/00 |
| 2021/0117459 A1* | 4/2021 | Tan | G06K 9/6276 |
| 2021/0149979 A1* | 5/2021 | Nagarjuna | G06F 16/36 |
| 2021/0183526 A1* | 6/2021 | Bader | G16H 70/60 |
| 2021/0397792 A1* | 12/2021 | Atallah | G06F 40/295 |

FOREIGN PATENT DOCUMENTS

| | | |
|---|---|---|
| CN | 109992788 A | 7/2019 |
| EP | 3926515 A1 * | 12/2021 |

OTHER PUBLICATIONS

"Models.fasttext —FastText model", Gensim, last updated Nov. 1, 2019, 19 pages, <https://radimrehurek.com/gensim/models/fasttext.html>.

"Models.word2vec—Word2vec embeddings", Gensim, last updated Nov. 1, 2019, 18 pages, <https://radimrehurek.com/gensim/models/word2vec.html>.

Kashyap, Prerna, "Sent2Vec: An unsupervised approach towards learning sentence embeddings", Rare Technologies, Jun. 19, 2018, 9 pages, <https://rare-technologies.com/sent2vec-an-unsupervised-approach-towards-learning-sentence-embeddings>.

* cited by examiner

TEXT-TO-VECTORIZED REPRESENTATION TRANSFORMATION

BACKGROUND

The present invention relates to natural language processing (NLP), and more specifically, to text-to-vectorized representation transformation.

With the development of computer technology, NLP becomes an important research direction. NLP can be used to implement the communication between people and machines. For example, through NLP techniques, the computer can understand natural languages and perform the commands from the user. Due to the complexity of natural languages, there are still many problems to be solved in NLP.

SUMMARY

According to one embodiment of the present invention, there is provided a computer-implemented method. According to the method, in accordance with a determination that a target text element is not in a set of reference text elements, information describing the target text element is obtained. The information comprises a set of descriptive text elements. A set of vectorized representations for the set of descriptive text elements is determined. A target vectorized representation for the target text element is determined based on the set of vectorized representations using a machine learning model. The machine learning model is trained to represent a predetermined association between the set of vectorized representations for the set of descriptive text elements describing the target text element and the target vectorized representation.

According to another embodiment of the present invention, there is provided a system. The system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
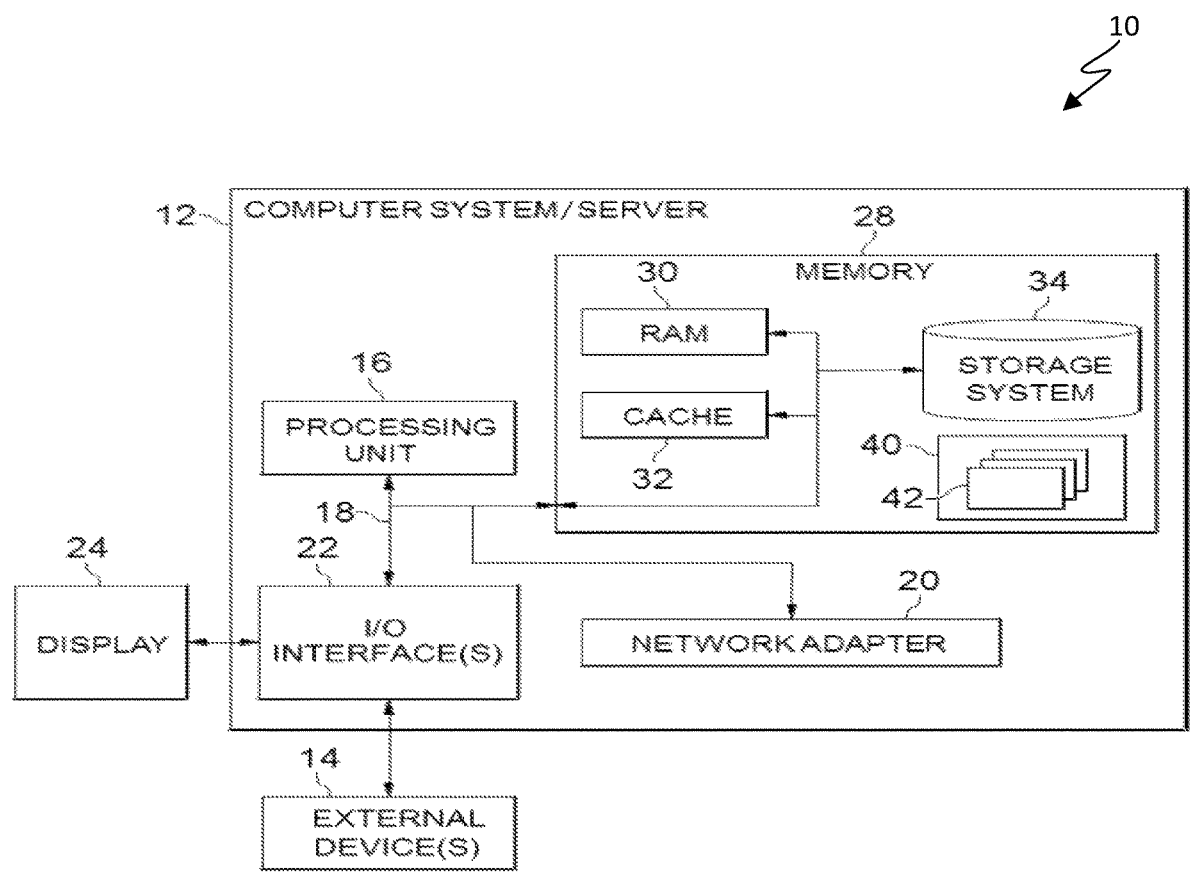
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
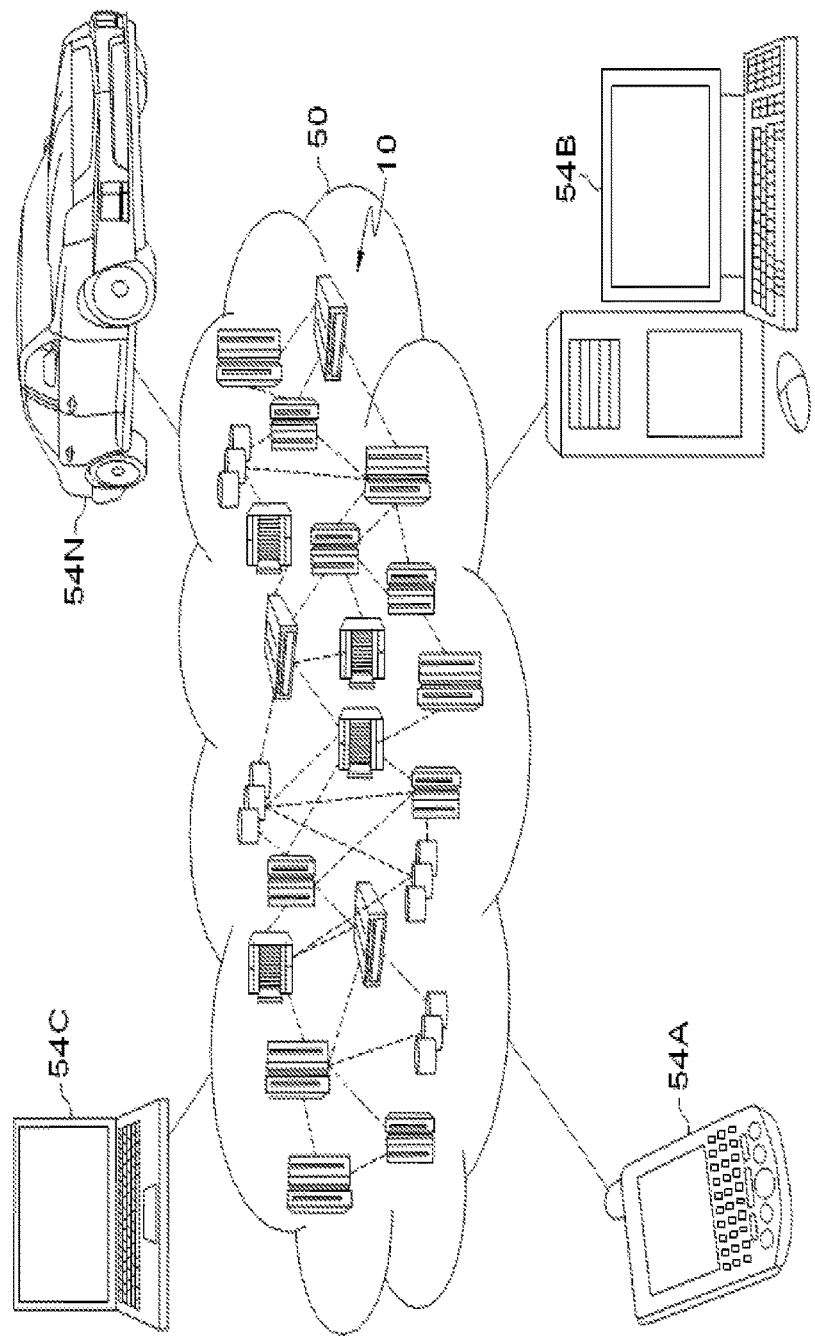
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that cloud computing nodes 10 and cloud computing environment 50 can communicate with any type of computerized device over any type of network and/or network addressable connection (e.g., using a web browser).

Figure 3:
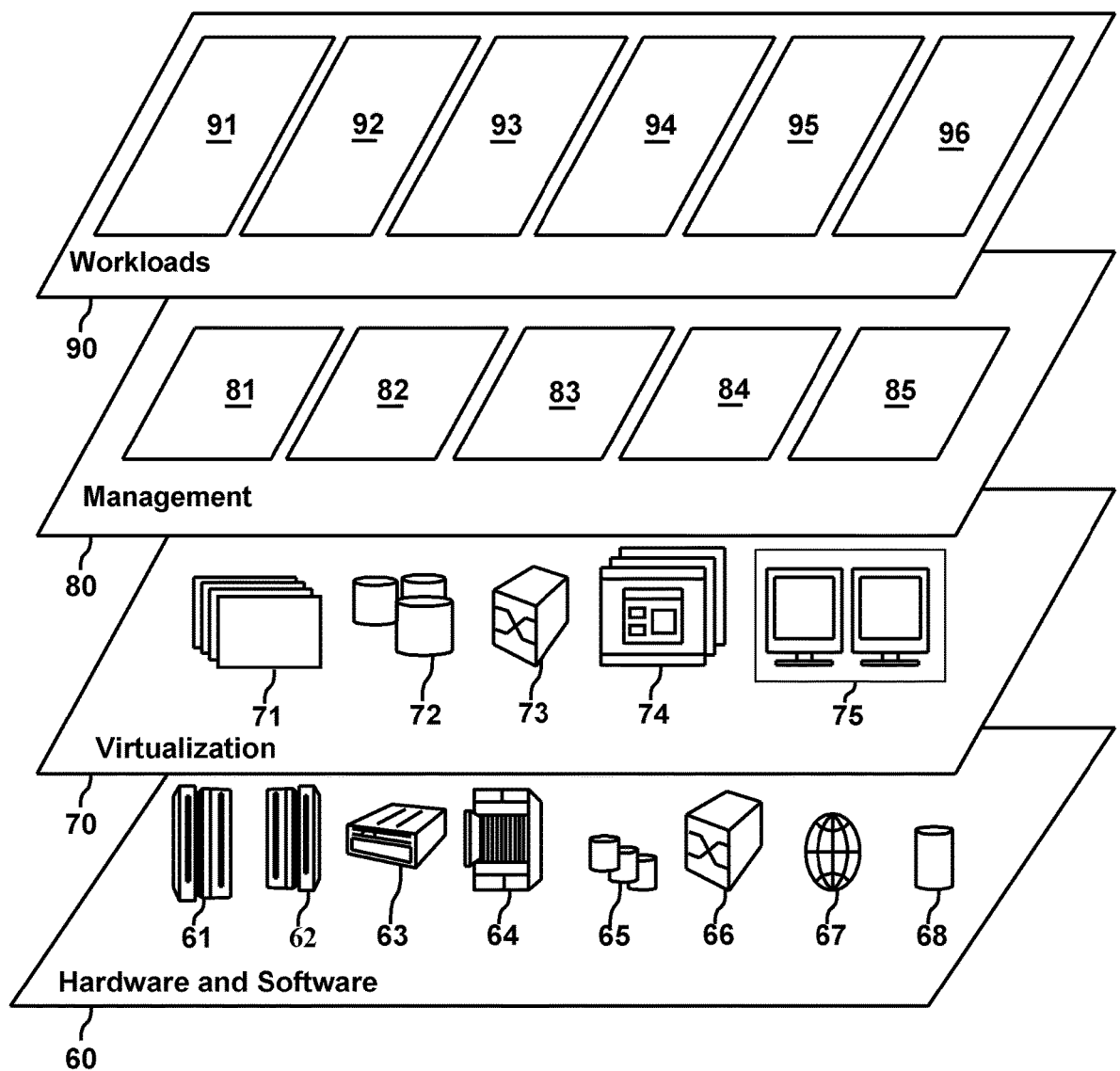
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and text-to-vectorized representation transformation 96. The functionalities of text-to-vectorized representation transformation 96 will be described in the following embodiment of the present disclosure.

Vectorized representations of words or phrases in natural languages are generally required in performing NLP tasks. As used herein, transforming a text element (such as a word or a phrase) to a vectorized representation refers to mapping the text element from the vocabulary to a vector of real numbers in a low-dimensional space. The vectorized representation may sometimes be referred to as a word embedding or a feature representation of the text element. The vectorized representations of different text elements are generated to facilitate the following NLP tasks.

Typically, a word embedding model, such as a word2vec model, may be trained based on a corpus to represent association between vectorized representations and text elements. By using the trained model, a vectorized representation of a text element may be generated by applying the text element as the input of the mode. However, the corpus used in the training may not include all text elements due to, for example, the limited amount of texts in the corpus or some new text elements created as natural languages develop. The text elements that do not included in the corpus may be referred as out-of-dictionary (OOD) text elements. If a text element is an OOD text element, the previously trained model may fail to provide an accurate vectorized representation for this text element.

In order to determine the vectorized representation of the OOD text element, one possible solution is to retrain a word embedding model based on a corpus including the OOD text element. However, the retraining process is time consuming and requires high resource costs. Another solution is to map all OOD text elements to a fixed vectorized representation. However, such fixed vectorized representation is obviously not precise and accurate.

In accordance with embodiments of the present invention, there is provided a solution for text-to-vectorized representation transformation. In this solution, if a target text element, such as an OOD text element, is not included in a set of target reference text elements, information describing the target text element is obtained. The information includes a set of descriptive text elements. The descriptive text element is a text element in the information used to describe the target text element, such as a word or a phrase. A set of vectorized representations for the set of descriptive text elements are determined and input to a machine learning model to generate a vectorized representation of the target text element.

Through this solution, it is possible to obtain more precise and accurate vectorized representations for text elements, which may be used to facilitate obtaining better results of NLP tasks. Moreover, this solution avoids model retraining when faced with OOD text elements, thereby reducing time and resources consumption.

Some example embodiments of the present invention will be described in detail with reference to the accompanying figures.

Figure 4:
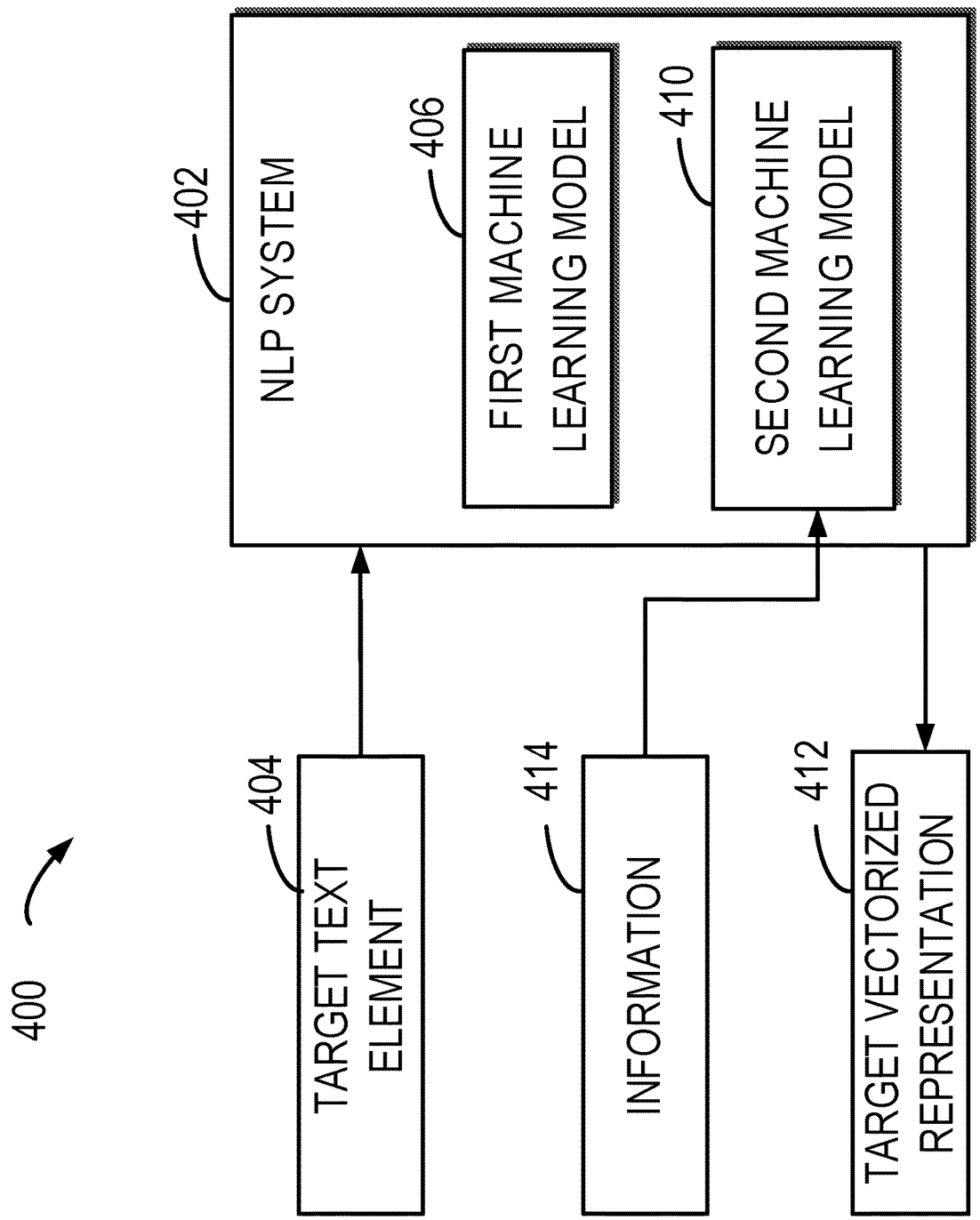
FIG. 4 depicts a block diagram of example architecture for obtaining vectorized representations of text elements according to an embodiment of the present invention.

Reference is first made to FIG. 4, which depicts a block diagram of example architecture 400 for obtaining vectorized representations of text elements according to an embodiment of the present invention.

In FIG. 4, an NLP system 402 is configured to generate a target vectorized representation 412 for a target text element 404. The target text element 404 may be provided from other computing devices or services. In some embodiments, the NLP system 402 may directly obtain the target text element 404 from a sentence, a text document, or any other text sources. As used herein, a text element may be divided from a sentence or a text document in any suitable granularity. In some embodiments, the text element may be a word or a phrase consisting of two or more words. The above examples are provided to merely illustrate the present invention, without suggesting any limitation.

In accordance with embodiments of the present invention, the NLP system 402 applies a two-level machine learning architecture to determine the target vectorized representation 412 for the target text element 404. Specifically, at a first level of machine learning, the NLP system 402 may obtain first machine learning model 406 that has been trained to represent an association between a set of reference text elements and corresponding vectorized representations. In one example, the set of reference text elements can be from a corpus that is used to obtain the first machine learning model 406, each being associated with a vectorized representation. Any type of machine learning model or deep learning model may be employed to build the first machine learning model 406. In an example, the first machine learning model 406 is a neural network model. In another example, the first machine learning model 406 is a word2vec model.

The NLP system 402 may attempt to determine the target vectorized representation 412 for the target text element 404 by using the first machine learning model 406. During this process, the NLP system 402 may determine whether the target text element 404 is included in the set of reference text elements, so as to determine whether the first machine learning model 406 is suitable for generating the target vectorized representation 412 for the target text element 404. For example, the NLP system 402 may compare the target text element 404 with each of the set of reference text elements to determine whether the target text element 404 is included in the set of reference text elements.

In some embodiments, if the target text element 404 is included in the set of reference text elements, the target vectorized representation 412 for the target text element 404 can be determined using the first machine learning model 406. If the target text element 404 is not included in the set of reference text elements, it means that the target text element 404 is an OOD text element and thus no vectorized representation is directly corresponding to the target text element 404.

In some embodiments, in the case that the target text element 404 is not in the set of reference text elements, the NLP system 402 may further attempt to determine the target vectorized representation 412 by searching for a synonymous text element as synonyms generally represent similar semantics. Specially, the NLP system 402 may determine whether the target text element 404 has a synonymous text element. In one example, the NLP system 402 may search for the synonymous text element from a dictionary. The dictionary may include many text elements and corresponding synonymous text elements. In another example, the synonymous text element for the target text element 404 can be searched from other information sources, such as webpages.

If the synonymous text element for the target text element 404 is found, the NLP system 402 determines whether the synonymous text element for the target text element 404 is included in the set of reference text elements. If the synonymous text element for the target text element 404 is included in the set of reference text elements, the NLP system 402 determines a vectorized representation for the synonymous text element using the first machine learning model 406. In this case, the NLP system 402 may determine the target vectorized representation 412 for the target text element 404 based on the vectorized representation for the synonymous text element.

In some embodiments, if one synonymous text element is obtained for the target text element, the vectorized representation of the synonymous text element may be determined as the target vectorized representation 412 for the target text element 404. In some embodiments, if two or more synonymous text elements for the target text element 404 are found and their vectorized representations can be determined using the first machine learning model 406, the NLP system 402 may determine the target vectorized representation 412 based on the two or more vectorized representations of the synonymous text elements, for example, by calculating an average of all the vectorized representations. Other calculation methods may also be applicable to the vectorized representations of the synonymous text elements, and the scope of the present invention is not limited in this regard.

If the target text element 404 is not in the set of reference text elements, if it fails to find any synonymous text element for the target text element 404, and/or if the synonymous text element for the target text element 404 is not included in the set of reference text elements, the first machine learning model 406 is not able to generate the target vectorized representation 412 for the target text element 404. In such case, the NLP system 502 proceeds to a next level of machine learning and attempts to determine the target vectorized representation 412 using second machine learning model 410.

It would be appreciated that although the determination of the target vectorized representation based on the synonymous text element has been described in the above, in some cases, the NLP system 402 may not consider the synonymous text element and directly proceed to a next-level machine learning in the case that the target text element 404 is determined to not be included in the set of reference text elements.

At the next-level machine learning, as compared with the first machine learning model 406, the used second machine learning model 410 is trained to generate a vectorized representation for a text element based on information describing the text element (also referred to as "descriptive information" of the text element). The information may be, for example, one or more sentences that define the text element or otherwise describe one or more related aspects of the text element. As a specific example, if a text element "Affenpinscher" is an OOD word, this word may be described with a sentence "This is a German dog". As such, "This is a German dog" is the descriptive information for "Affenpinscher".

To facilitate the processing within the second machine learning model 410, the information describing the text element may be divided into a set of descriptive text elements. Accordingly, the second machine learning model 410 represents an association between a set of vectorized representations for the set of descriptive text elements describing the target text element 404 and the target vectorized representation for the target text element 404.

In some embodiments, the second machine learning model 410 is a neural network model. In some embodiments, the second machine learning model 410 is a recurrent neural network model, such as a bidirectional Gated Recurrent Unit (GRU). Any type of machine learning model or deep learning model may be employed to build the second machine learning model 410. In some embodiments, the second machine learning model 410 is a decision tree model. The training of the second machine learning model 410 will be described in detail in the following with reference to FIG. 6.

In order to determine the target vectorized representation 412 for the current target text element 404 using the second machine learning model 410, the NLP system 402 determines information 414 that describes the target text element 404, which may be divided into a set of descriptive text elements for inputting to the second machine learning model 410. In some embodiments, the information 414 can be obtained from a dictionary. The dictionary may include various text elements and corresponding information describing the respective text elements. The NLP system 402 may search for the target text element 404 from the dictionary. If target text element 404 is found in the dictionary, the NLP system 402 obtains the information 414 describing the target text element 404 from the dictionary.

In some embodiments, the dictionary may comprise any suitable electronic dictionary for the natural language(s) corresponding to the text elements, such as an English dictionary, a Chinese dictionary, and so on. Alternatively, or in addition, the dictionary may be determined from webpages or other information sources, such as database or knowledge bases. In some embodiments, instead of determining the dictionary in advance, the NLP system 402 may search for the information 414 from webpages or any other information sources, such as databases or knowledge bases.

The information 414 is processed by the NLP system 402 to generate a set of descriptive text elements included in the information 414. The NLP system 402 then determines a set of vectorized representations for the set of descriptive text elements by using the first machine learning model 406. The vectorized representations for the set of descriptive text elements may also be determined based on the first machine learning model 406. Specifically, for each descriptive text element, the NLP system 402 may determine whether the descriptive text element is included in the set of reference text elements associated with the first machine learning model 406.

In some embodiments, if the descriptive text element is included in the set of reference text elements, the vectorized representation for the descriptive text element can be determined by the first machine learning model 406. If the descriptive text element is not included in the set of reference text elements, it means that the descriptive text element is also an OOD text element and thus no vectorized representation directly corresponding to the descriptive text element.

In some embodiments, in the case that the descriptive text element is not included in the set of reference text elements, the NLP system 402 may attempt to determine the vectorized representation for the descriptive text element by searching for a synonymous text element for the descriptive text element. The process for searching for the synonymous text element for the descriptive text element is similar with that of the target text element 404. Thus, the process is not described in detail here for purpose of brevity.

If there is the synonymous text element for the descriptive text element, the process for determining the vectorized representation for the descriptive text element is also similar with that of the target text element 404. The process is not also described in detail. If the descriptive text element is not in the set of reference text elements, if it fails to find any synonymous text element for the descriptive text element, and/or if the synonymous text element for the descriptive text element is not included in the set of reference text elements, the vector representation for the descriptive text element is set as a predetermined value, such as zero. It would be appreciated that the information 414 describing the target text element 404 may generally include some general description and thus there is a high probability that the descriptive text element or their synonymous text elements are covered in the set of reference elements.

After obtaining the set of vector representations for the set of descriptive text elements, the NLP system 402 uses the second machine learning model 410 to process the set of vectorized representations for the set of descriptive text elements. In particular, the set of vectorized representations are used as an input to the second machine learning model 410. Then, the target vectorized representation 412 can be generated as an output from the second machine learning model 410.

In some embodiments, the input to the second machine learning model 410 may be of a predetermined size, for example, in bits. That is, there are a threshold number of vectorized representations that can be used as an input of the second machine learning model 410, each having a same fixed number of bits. If the number of the set of vectorized representations for the descriptive text elements is less than the threshold number, the remaining partition of the input may be padded with a predetermined value, such as zero. If the number of the set of vectorized representations for the descriptive text elements is larger than the threshold number, the threshold number of vectorized representations are selected from the set of vectorized representations for the descriptive text elements for use as the input to the second machine learning model 410. In one example, the threshold number of vectorized representations is selected from the beginning of the set of vectorized representations sorted in an order of the set of descriptive text elements. Of course, the threshold number of vectorized representations may be selected in other manners, for example, in a random selection manner. The scope of the present disclosure is not limited in this regard.

Figure 5:
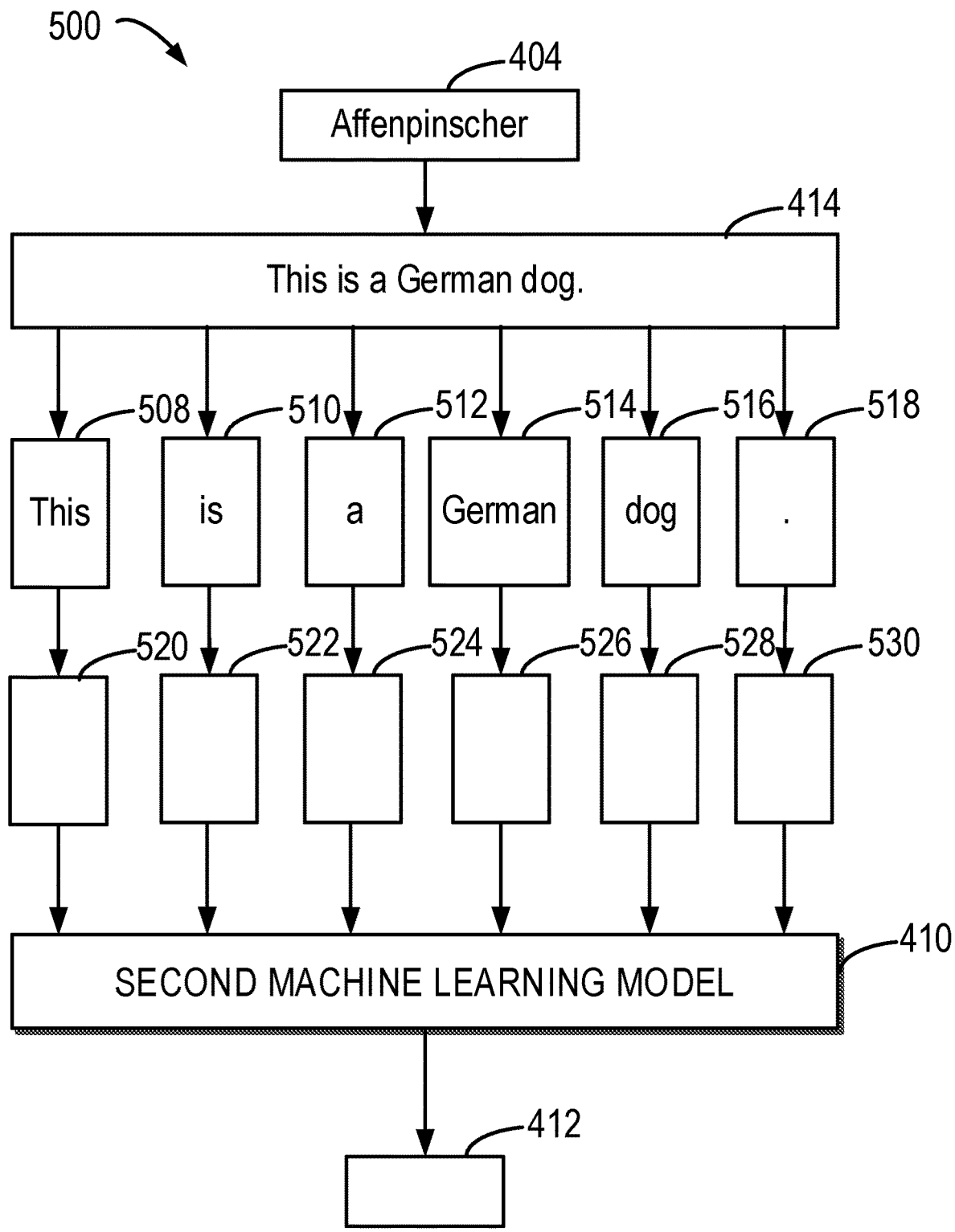
FIG. 5 depicts an example for obtaining a target vectorized representation according to an embodiment of the present invention.

In order to better understand the invention, an example of obtaining a target vectorized representation 412 of a target text element 404 will be described in detailed with reference to FIG. 5. FIG. 5 depicts an example 500 for obtaining a target vectorized representation according to an embodiment of the present invention. As shown in FIG. 5, the target text element 404 is an OOD word, "Affenpinscher." The information 414 describing "Affenpinscher" can be obtained from various resources such as a dictionary or webpages. For example, the information 414 may include a sentence "This is a German dog."

The information 414 is divided into descriptive text elements 508, 510, 512, 514, 516, and 518. For example, the descriptive text element 508 is "this", the descriptive text element 510 is "is", the descriptive text element 512 is "a", the descriptive text element 514 is "German", the descriptive text element 516 is "dog", and the descriptive text element 518 is a dot symbol ".". Vectorized representations 520, 522, 524, 526, 528, and 530 corresponding to the descriptive text elements 508, 510, 512, 514, 516, and 518 can be obtained by using the first machine learning model 406. The vectorized representations 520, 522, 524, 526, 528, and 530 are input into the second machine learning model 410, and the second machine learning model 410 processes the vectorized representations 520, 522, 524, 526, 528, and 530 to generate the target vectorized representation 412 for the target text element 404.

By using the second machine learning model 410 and the set of vectorized representations corresponding to information describing the target text element 404, the obtained target vectorized representation 412 is more precise and accurate. Meanwhile, the first machine learning model 406 is not required to be rebuilt or retrained, thereby reducing time and resources consumption. The whole two-level machine learning architecture according to the embodiments of the present invention can be flexibly applied to handle the OOD problem in various applications.

Next, the training of the second machine learning model 410 will be described in detail. The second machine learning model 410 may be trained by using a sample vectorized representation for a sample text element and a set of sample vectorized representations for a set of sample descriptive text elements corresponding to the sample text element. The sample vectorized representation for the sample text element is used as an output of the second machine learning model 410. The set of sample vectorized representations for the set of sample descriptive text elements are used as an input of the second machine learning model 410. The set of sample descriptive text elements may be derived from information describing the sample text element. It would be appreciated that a certain amount of sample text elements and corresponding information describing the sample text elements may be used to train the second machine learning model 410 to meet a certain convergence condition for the training. In some embodiments, the second machine learning model 410 is trained by the NLP system 402. In some embodiments, the second machine learning model 410 is trained externally and obtained by the NLP system 402 from other computer systems/servers, for example, via network connections.

Figure 6:
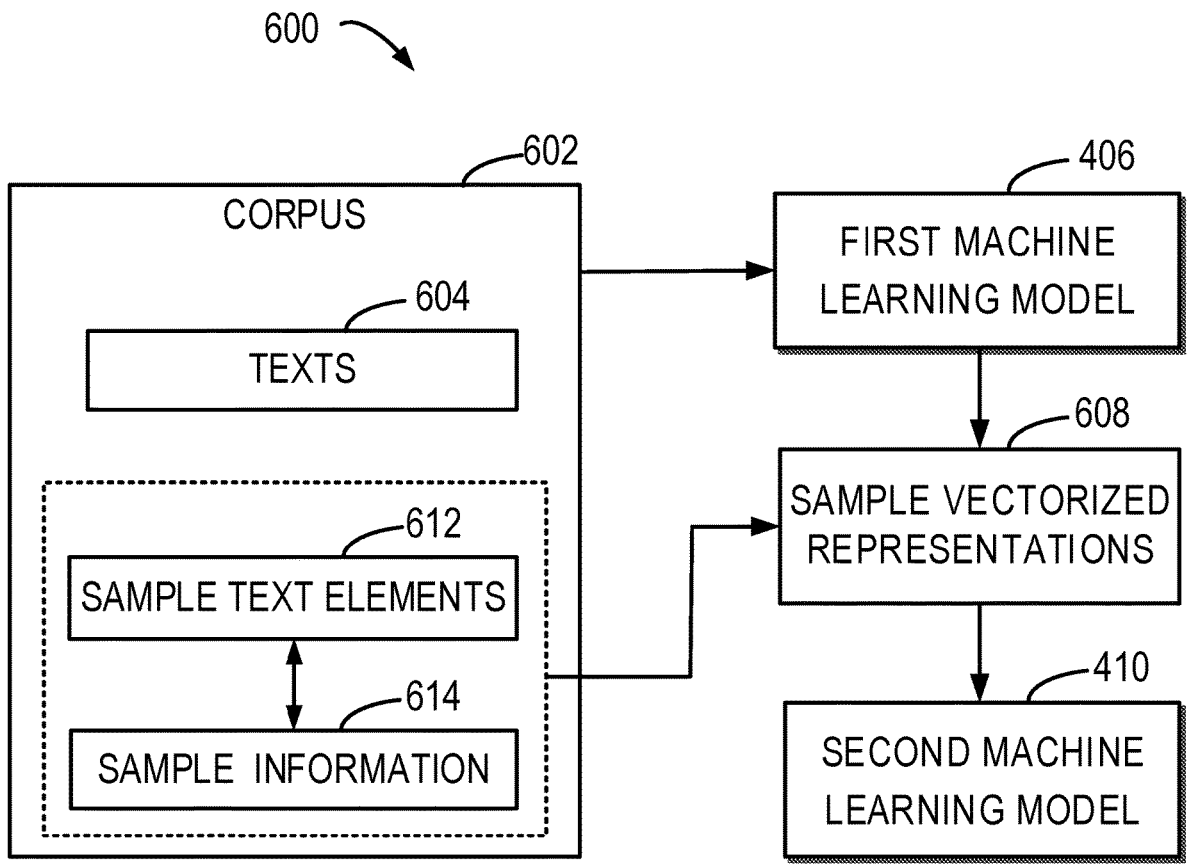
FIG. 6 depicts an example for training the machine learning machine according to an embodiment of the present invention.

FIG. 6 depicts an example 600 for training the second machine learning model 410 according to an embodiment of the present invention. The training of the second machine learning model 410 can be implemented by the NLP system 402 in FIG. 4 or by one or more other computer servers/systems. The scope of the present invention is not limited in this regard. For the purpose of description only, the training process is described from the perspective of the NLP system 402 in the following.

The NLP system 402 can obtain a corpus 602 which is used to train the first machine learning model 406. Although FIG. 6 also shows training of the first machine learning model 406, it would be appreciated that the first machine learning model 406 can be pre-trained by other computer systems or servers and used to train the second machine learning model 410. In this case, it can save a lot of time for obtaining the first machine learning model 406.

The corpus 602 includes texts 604 which are used to train the first machine learning model 406. Sample text elements 612 and sample information 614 are used to train the second machine learning model 410, as will be described in the following description. In some embodiments, in order to ensure that the trained first machine learning model 406 can always generate vectorized representation for the sample text elements 612 and the sample information 614 used to train the second machine learning model 410, the sample text elements 612 and the sample information 614 may be included in the corpus 602, as illustrated, for use in training of the first machine learning model 406.

In one example, the texts 604 are obtained from various sources, such as webpages, industrial database, knowledge bases, and the like. The sample text elements 612 and the sample information 614 are obtained from a dictionary. Alternatively, the dictionary used to obtain the sample text elements 612 and the sample information 614 may be the same or different from the dictionary that is used to determine the sample information 414 describing the target text element 404. In yet another example, the sample text elements 612 and the sample information 614 are obtained from databases or knowledge bases.

The first machine learning model 406 is trained first using the corpus 602, including the texts 604 and probably the sample text elements 612 and the sample information 614. The trained first machine learning model 406 can then be used to determine sample vectorized representations 608 that are used to train the second machine learning model 410. For each sample text element, a sample text vectorized representation for a sample text element 612 is determined by using the first machine learning model 406. The information for each sample text element includes a set of sample descriptive text elements for the sample text element. A set of sample descriptive vectorized representations of the set of sample descriptive text elements are also determined by using the first machine learning model 406. The sample text vectorized representation and the set of sample descriptive vectorized representation together form the sample vectorized representation 608.

The second machine learning model 410 is trained based on the sample vectorized representation 608. For example, the sample text vectorized representation for the sample text element 612 is used an output of the second machine learning model 410, and the set of sample descriptive vectorized representations for the set of sample descriptive text elements of the sample text element is used as an input of the second machine learning model 410. The training process is iterated in such a way that the second machine learning model 410 can generate a vectorized representation that is similar to the sample descriptive vectorized representation. It would be appreciated that any appropriate training method can be used in the process of training the machine learning models.

Figure 7:
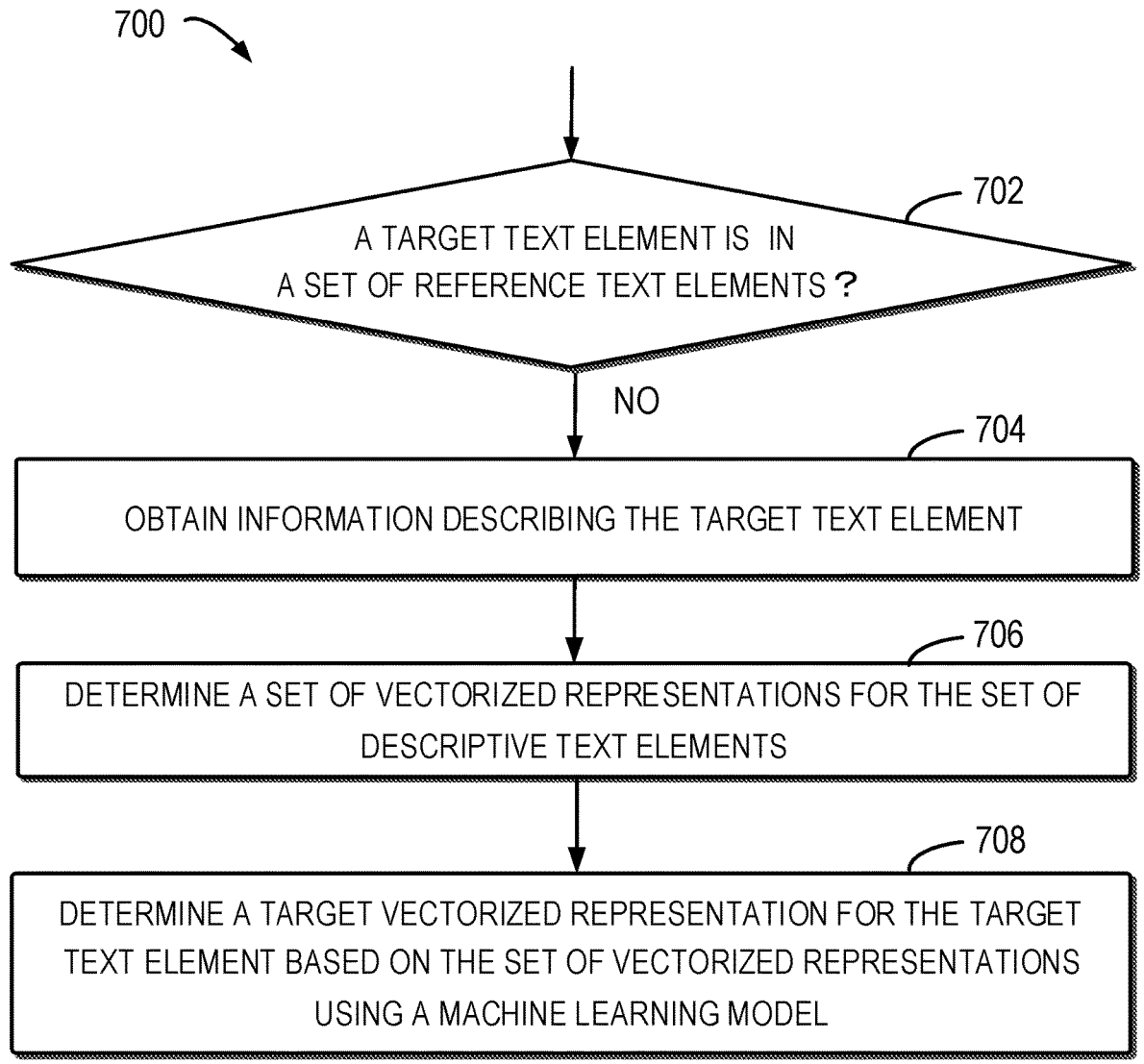
FIG. 7 depicts a flowchart of an example method according to an embodiment of the present invention.

FIG. 7 shows a flowchart of an example method 700 according to an embodiment of the present invention. The method 700 can be implemented at the NLP system 402 of FIG. 4. For the purpose of discussion, the method 700 will be described from the perspective of the NLP system 402 with reference to FIG. 4.

At block 702, the NLP system 402 determines whether a target text element 404 is in a set of reference text elements. If the target text element 404 is not in a set of reference text elements, at block 704, the NLP system 402 obtains information describing the target text element 404. The information comprises a set of descriptive text elements. At block 706, the NLP system 402 determines a set of vectorized representations for the set of descriptive text elements. At block 708, the NLP system 402 determines a target vectorized representation 412 for the target text element 404 based on the set of vectorized representations using a second machine learning model 410. The second machine learning model 410 is trained to represent a predetermined association between the set of vectorized representations for the set of descriptive text elements describing the target text element 404 and the target vectorized representation 412.

In some embodiments, obtaining the information describing the target text element comprises: in accordance with a determination that the target text element is not in the set of reference text elements, determining a synonymous text element for the target text element; and in accordance with a determination that the synonymous text element for the target text element is not in the set of reference text elements, obtaining the information describing the target text element.

In some embodiments, the method 700 further comprises in accordance with a determination that the synonymous text element for the target text element is in the set of reference text elements, determining a vectorized representation for the synonymous text element based on a further predetermined association; and determining the target vectorized representation for the target text element based on the vectorized representation for the synonymous text element.

In some embodiments, obtaining the information describing the target text element comprises: searching for the target text element from a dictionary; and in response to the target text element being found in the dictionary, obtaining the information describing the target text element from the dictionary.

In some embodiments, the set of reference text elements are mapped to a set of vectorized presentations based on a further predetermined association.

In some embodiments, determining the set of vectorized representations comprises: determining the set of vectorized representations for the set of descriptive text elements based on the further predetermined association, respectively.

In some embodiments, determining the set of vectorized representations for the set of descriptive text elements comprises: determining whether the set of descriptive text elements are in the set of reference text elements; in accordance with a determination that a first descriptive text element of the set of descriptive text elements is in the set of reference text elements, determining a first vectorized representation for the first descriptive text element based on the further predetermined association; and in accordance with a determination that a second descriptive text element of the set of descriptive text elements is not in the set of reference text elements, determining a second vectorized representation for the second descriptive text element based on the further predetermined association and a synonymous text element for the second descriptive text element.

In some embodiments, the further predetermined association is represented by a further machine learning model trained based on a corpus comprising the set of reference text elements.

In some embodiments, the machine learning machine is trained based on a sample vectorized representation for a sample text element and a set of sample vectorized representations for a set of sample descriptive text elements, the set of sample descriptive text elements being comprised in information describing the sample text element.

It should be noted that the processing of text-to-vectorized representation transformation according to embodiments of this disclosure could be implemented by computer system/server 12 of FIG. 1.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   in accordance with a determination that a target text element is not in a set of reference text elements, obtaining, by one or more processors, information describing the target text element, the information comprising a set of descriptive text elements and
   wherein the set of reference text elements are mapped to a set of vectorized presentations based on a further predetermined association and wherein the further predetermined association is represented by a first machine learning model trained based on a corpus comprising the set of reference text elements;
   determining, by the one or more processors, a set of vectorized representations for the set of descriptive text elements further comprises:
      determining, by the one or more processors, the set of vectorized representations for the set of descriptive text elements based on the further predetermined association, respectively; and
   determining, by the one or more processors, a target vectorized representation for the target text element based on the set of vectorized representations using a second machine learning model, the second machine learning model being trained to represent a predetermined association between the set of vectorized representations for the set of descriptive text elements describing the target text element and the target vectorized representation.

2. The computer-implemented method according to claim 1, wherein obtaining the information describing the target text element comprises:
   in accordance with a determination that the target text element is not in the set of reference text elements, determining, by the one or more processors, a synonymous text element for the target text element; and
   in accordance with a determination that the synonymous text element for the target text element is not in the set of reference text elements, obtaining, by the one or more processors, the information describing the target text element.

3. The computer-implemented method according to claim 2, further comprising:
in accordance with a determination that the synonymous text element for the target text element is in the set of reference text elements, determining, by the one or more processors, a vectorized representation for the synonymous text element based on a further predetermined association; and
determining, by the one or more processors, the target vectorized representation for the target text element based on the vectorized representation for the synonymous text element.

4. The computer-implemented method according to claim 1, wherein obtaining the information describing the target text element comprises:
searching, by the one or more processors, for the target text element from a dictionary; and
in response to the target text element being found in the dictionary, obtaining, by the one or more processors, the information describing the target text element from the dictionary.

5. The computer-implemented method according to claim 1, wherein the first machine learning model is a neural network model.

6. The computer-implemented method according to claim 1, wherein the second machine learning model is a recurrent neural network model.

7. The computer-implemented method according to claim 1, wherein determining the set of vectorized representations for the set of descriptive text elements comprises:
determining, by the one or more processors, whether the set of descriptive text elements are in the set of reference text elements;
in accordance with a determination that a first descriptive text element of the set of descriptive text elements is in the set of reference text elements, determining, by the one or more processors, a first vectorized representation for the first descriptive text element based on the further predetermined association; and
in accordance with a determination that a second descriptive text element of the set of descriptive text elements is not in the set of reference text elements, determining, by the one or more processors, a second vectorized representation for the second descriptive text element based on the further predetermined association and a synonymous text element for the second descriptive text element.

8. The computer-implemented method according to claim 1, wherein the machine learning machine is trained based on a sample vectorized representation for a sample text element and a set of sample vectorized representations for a set of sample descriptive text elements, the set of sample descriptive text elements being comprised in information describing the sample text element.

9. A computer system comprising:
one or more computer processors;
one or more computer readable storage media;
program instructions stored on the one or more computer readable storage media for execution by at least one of the one or more computer processors, the program instructions comprising:
in accordance with a determination that a target text element is not in a set of reference text elements, program instructions to obtain information describing the target text element, the information comprising a set of descriptive text elements and wherein the set of reference text elements are mapped to a set of vectorized presentations based on a further predetermined association and wherein the further predetermined association is represented by a first machine learning model trained based on a corpus comprising the set of reference text elements;
program instructions to determine a set of vectorized representations for the set of descriptive text elements further comprising:
program instructions to determine the set of vectorized representations for the set of descriptive text elements based on the further predetermined association, respectively; and
program instructions to determine a target vectorized representation for the target text element based on the set of vectorized representations using a second machine learning model, the second machine learning model being trained to represent a predetermined association between the set of vectorized representations for the set of descriptive text elements describing the target text element and the target vectorized representation.

10. The computer system according to claim 9, wherein obtaining the information describing the target text element comprises:
in accordance with a determination that the target text element is not in the set of reference text elements, program instructions to determine a synonymous text element for the target text element; and
in accordance with a determination that the synonymous text element for the target text element is not in the set of reference text elements, program instructions to obtain the information describing the target text element.

11. The computer system according to claim 10, wherein the acts further comprise:
in accordance with a determination that the synonymous text element for the target text element is in the set of reference text elements, program instructions to determine a vectorized representation for the synonymous text element based on a further predetermined association; and
program instructions to determine the target vectorized representation for the target text element based on the vectorized representation for the synonymous text element.

12. The computer system according to claim 9, wherein obtaining the information describing the target text element comprises:
program instructions to search for the target text element from a dictionary; and
in response to the target text element being found in the dictionary, program instructions to obtain the information describing the target text element from the dictionary.

13. The computer system according to claim 9, wherein the first machine learning model is a neural network model.

14. The computer system according to claim 9, wherein the further second machine learning model is a recurrent neural network model.

15. The computer system according to claim 9, wherein the set of vectorized representations for the set of descriptive text elements comprises:

program instructions to determine whether the set of descriptive text elements are in the set of reference text elements;

in accordance with a determination that a first descriptive text element of the set of descriptive text elements is in the set of reference text elements, program instructions to determine a first vectorized representation for the first descriptive text element based on the further predetermined association; and in accordance with a determination that a second descriptive text element of the set of descriptive text elements is not in the set of reference text elements, program instructions to determine a second vectorized representation for the second descriptive text element based on the further predetermined association and a synonymous text element for the second descriptive text element.

16. The computer system according to claim 9, wherein the machine learning machine is trained based on a sample vectorized representation for a sample text element and a set of sample vectorized representations for a set of sample descriptive text elements, the set of sample descriptive text elements being comprised in information describing the sample text element.

17. A computer program product comprising:
one or more computer readable storage media and program instructions stored on the one or more computer readable storage media, the program instructions comprising:
in accordance with a determination that a target text element is not in a set of reference text elements, program instructions to obtain information describing the target text element, the information comprising a set of descriptive text elements and wherein the set of reference text elements are mapped to a set of vectorized presentations based on a further predetermined association and wherein the further predetermined association is represented by a first machine learning model trained based on a corpus comprising the set of reference text elements;

program instructions to determine a set of vectorized representations for the set of descriptive text elements further comprising:
program instructions to determine the set of vectorized representations for the set of descriptive text elements based on the further predetermined association, respectively; and program instructions to determine a target vectorized representation for the target text element based on the set of vectorized representations using a second machine learning model, the second machine learning model being trained to represent a predetermined association between the set of vectorized representations for the set of descriptive text elements describing the target text element and the target vectorized representation.

18. The computer program product according to claim 17, wherein program instructions to obtain the information describing the target text element comprises:
program instructions to search for the target text element from a dictionary; and
in response to the target text element being found in the dictionary, program instructions to obtain the information describing the target text element from the dictionary.

* * * * *